H. A. BALLARD.
METHOD OF MAKING LASTS.
APPLICATION FILED MAR. 29, 1909. RENEWED MAY 4, 1911.
1,104,743.
Patented July 21, 1914.
3 SHEETS—SHEET 1.
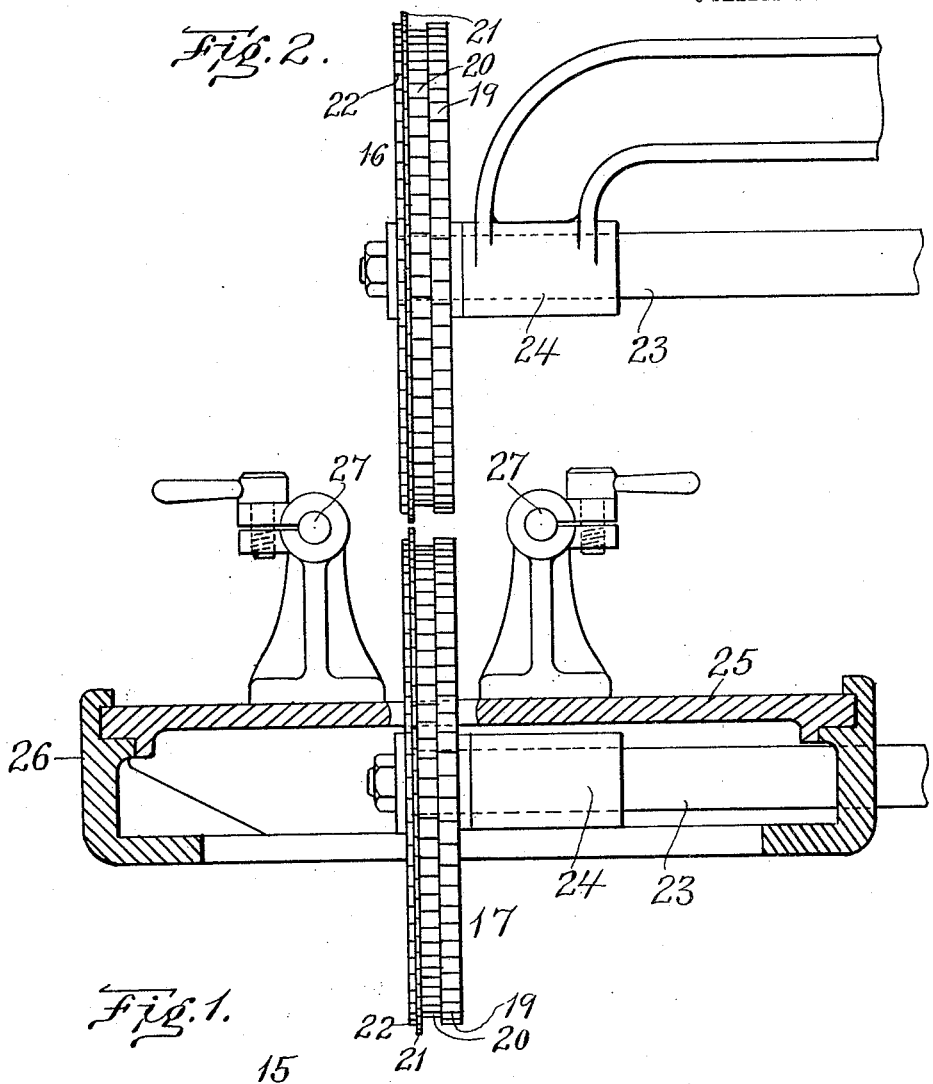
Witnesses.
F. R. Roulstone
C. N. Pezzetti
Inventor.
Harrie A. Ballard
by [signature]
Attorneys H. A. BALLARD.
METHOD OF MAKING LASTS.
APPLICATION FILED MAR. 29, 1909. RENEWED MAY 4, 1911.
1,104,743.
Patented July 21, 1914.
3 SHEETS—SHEET 2.
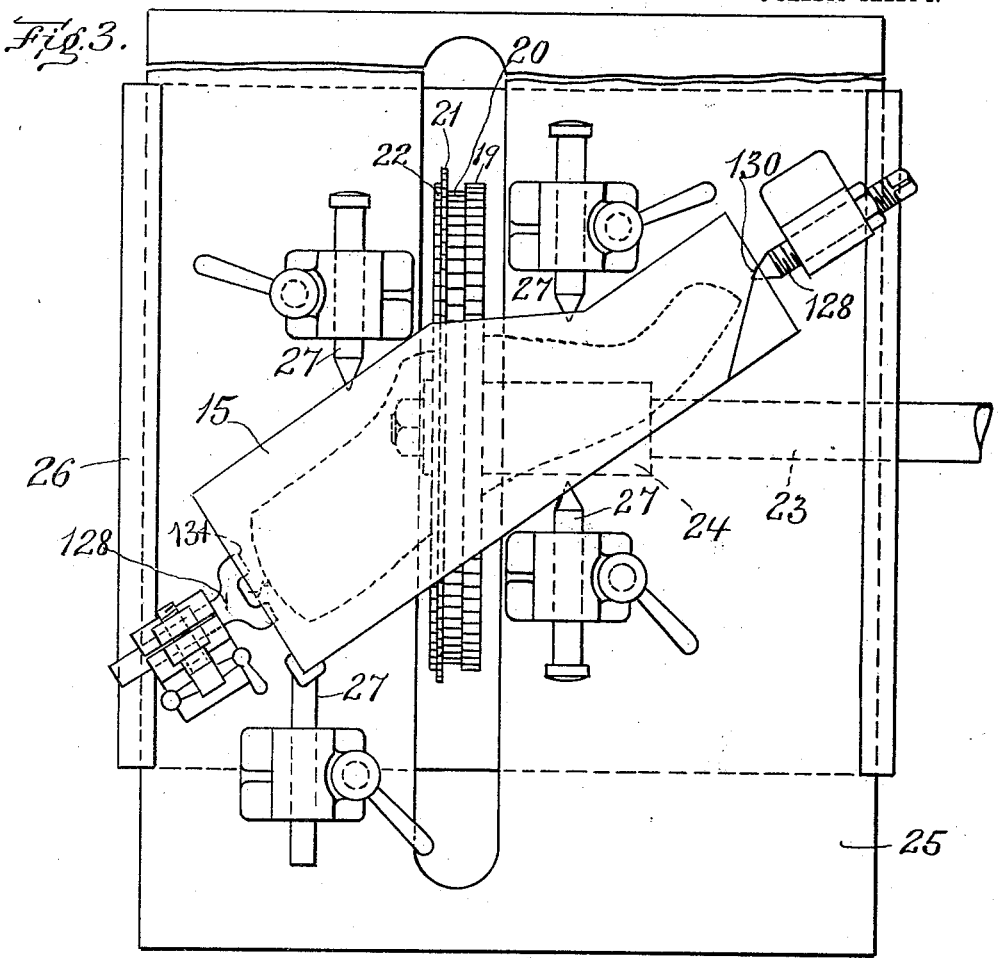
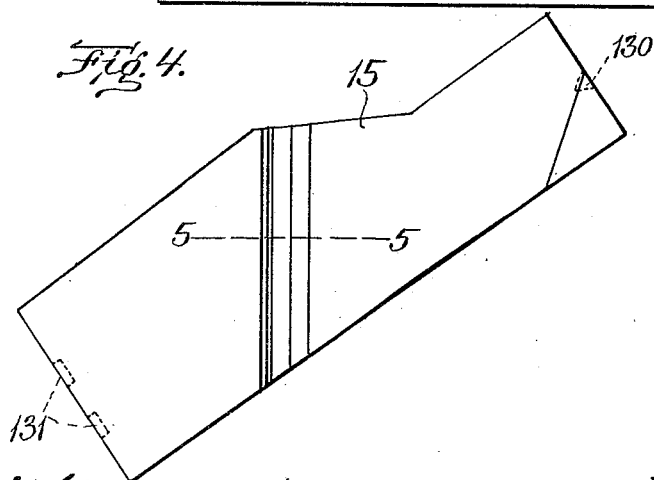
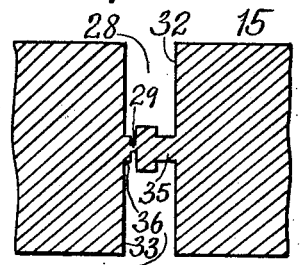

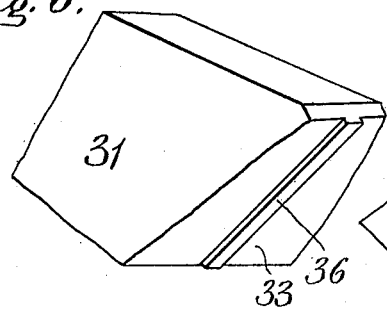
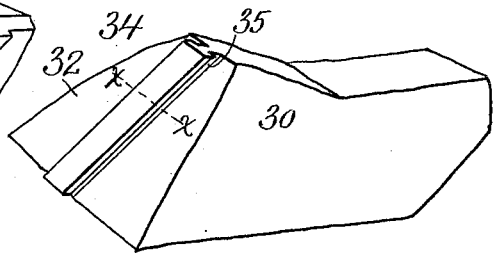
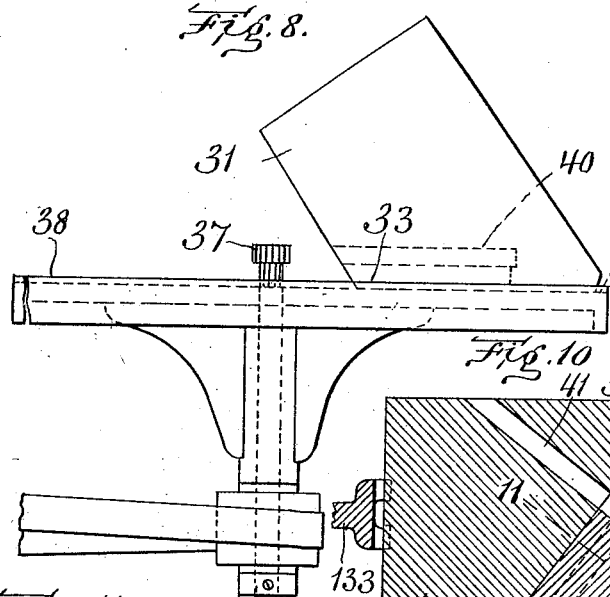
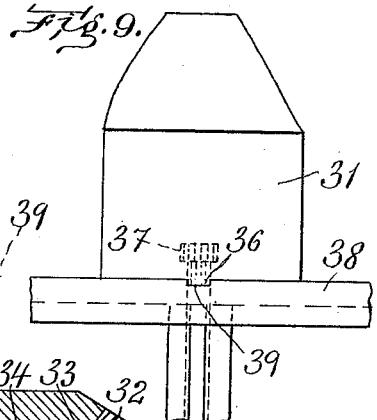
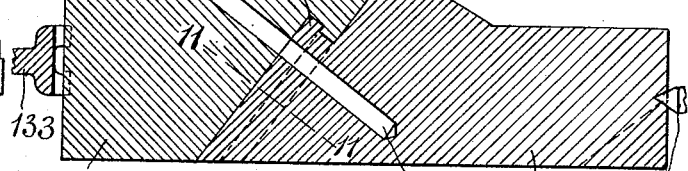
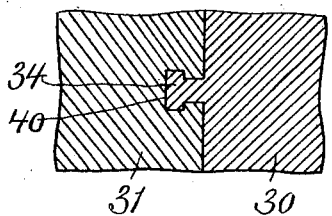
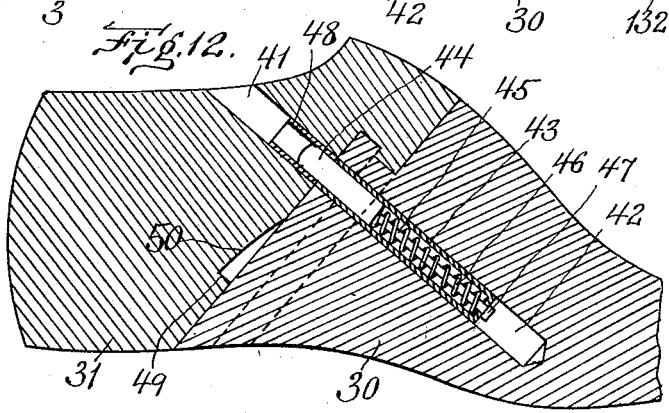

UNITED STATES PATENT OFFICE.

HARRIE A. BALLARD, OF BOSTON, MASSACHUSETTS, ASSIGNOR TO THE BOYLSTON MFG. COMPANY, OF SOUTH BOSTON, MASSACHUSETTS, A CORPORATION OF NEW JERSEY.

METHOD OF MAKING LASTS.

1,104,743.  Specification of Letters Patent.  Patented July 21, 1914.

Application filed March 29, 1909, Serial No. 486,462. Renewed May 4, 1911. Serial No. 625,881.

*To all whom it may concern:*

Be it known that I, HARRIE A. BALLARD, of Boston, in the county of Suffolk and State of Massachusetts, have invented certain new and useful Improvements in Methods of Making Lasts, of which the following is a specification.

This invention relates to lasts and it has for its object to provide a process of making the same. The product of the herein described process is a last comprising a forepart and heel-part formed with interlocking tongue and groove portions by which the two parts may be held together in sliding relation. The object of so forming the last is to adapt it to be foreshortened by sliding the heel-part relatively to the forepart for the purpose of facilitating the removal of the last from a shoe.
Of the accompanying drawings which illustrate a series of operations of a process by which such a last may be produced, Figure 1 is a bottom plan view of a blank or block of which a last is to be formed.
Fig. 2 is an edge view of a pair of circular cutters which may be employed in the first operation for dividing the blank into a forepart and heel-part. Fig. 3 is a sectional view of a work carriage for feeding the blank to the circular cutters. Fig. 4 is an elevation of the blank after having been cut by the circular cutters. Fig. 5 is a section on line 5—5 of Fig. 4. Figs. 6 and 7 are perspective views respectively of the heel-part and forepart after they have been cut by the circular cutters. Fig. 8 is a side elevation of a milling cutter and work table with the heel-part thereon. Fig. 9 is a front elevation of the heel-part and a fragment of the work table appearing in Fig. 8. Fig. 10 is a longitudinal section of the forepart and heel-part assembled in interlocked relation prior to forming the exterior of the last. Fig. 11 is a section on line 11—11 of Fig. 10. Fig. 12 is a longitudinal section of a completed last.

The same reference characters indicate the same parts wherever they occur.

By reference to the drawings it will be observed that the forming or turning of the exterior of the last is the final operation. In other words the last blank is severed, grooved, fitted, assembled and locked prior to the operation of turning or forming the last. By performing the several operations in the order illustrated and hereinafter described, absolute accuracy in fitting the forepart and heel-part is insured.

The process and order of operations is as follows:—Referring first to Fig. 1 in which is shown a last blank 15, the relative size of the completed last to be formed out of said blank is shown by dotted lines. The first operation is that of severing the blank 15 so as to produce a forepart and heel-part. The blank is severed in a plane which shall be finally inclined to a transverse perpendicular plane, and so that the forepart and heel-part shall abut against each other in a plane intersecting the instep at the top and a point at the rear of the arch at the bottom. The severing operation may be performed by circular cutters each of which comprises a gang of saws which not only divide the blank into a forepart and heel-part but which form on the forepart an undercut tongue and on the heel-part a rib which may be employed as a guide in the subsequent operation of forming a complemental undercut groove in the heel-part.

The cutters for so dividing the blank are illustrated in Fig. 2 and are indicated at 16 and 17. Each cutter comprises a gang of four separate circular saws 19, 20, 21 and 22. Each gang of saws is clamped upon an arbor 23 and the arbors are mounted in parallel bearings 24 and are preferably driven so as to revolve in unison but in opposite directions. The saws of largest diameter are the saws 21 which may be termed the "severing saws". The arbors 23 are preferably arranged so that the saws 21 may operate as closely to each other as possible without interference. The saws 19 and 20 may be termed the "tongue saws", of which 20 form the head of the tongue and of which 19 form the neck or undercut portion of the tongue. The saws 22 may be termed the "heel rib saws" because they leave a rib on the front face of the heel-part for a purpose hereinafter described. Fig. 2 also illustrates a work carriage 25 and a support 26 in which the carriage is adapted to slide for the purpose of feeding the blank 15 to the cutters. The carriage 25 may be provided with any desired form of work holders such as the pointed studs indicated at 27 and the alined end studs 128. The studs 27 may be adjustably mounted in any convenient manner, that shown consisting of a split clamping support for each, and a clamp-tightening member. The studs 128 are adjustable and they are intended to form indentations 130 and 131 in the ends of the blank, which may serve as guides to receive the coöperative centers 132, 133 of a last-turning lathe. The axes of the studs 128 are in the horizontal plane of the median line between the cutters 16 and 17 and they bear a definite angular relation to said cutters which insures the desired angle of the secant faces when the blank is subsequently mounted in the lathe in accordance with the line of the indentations. Each cutter cuts substantially half way through the blank when it is securely held in the position shown while it is being fed to the cutters. After the blank has been cut by the cutters shown in Fig. 2, it is in the condition shown by Figs. 4 and 5. In this condition the blank is provided with inclined grooves 28 one in each side. The grooves formed by the saws 21 are so deep as to almost, if not completely, sever the blank in two parts. In case any part of the blank is left uncut by these saws, it has the form of an extremely thin web 29 which may be readily broken. When broken the blank comprises a forepart 30 and heel-part 31 having parallel faces 32 and 33.

Referring now to Figs. 5 and 7, it will be seen that the rear face of the forepart is provided with a tongue comprising an elongated head 34 and a reduced or undercut neck 35 by which it is joined to the forepart. The heel-part shown by Figs. 5 and 6, is formed with a rib 36 which is formed by the saws 21.

The next operation is forming an undercut groove in the heel-part for the reception of the undercut tongue on the forepart. This may be done by a milling cutter 37, shown in Fig. 8. 38 represents a work table upon which the heel-part 31 may be fed to the milling cutter. The heel-part is laid so that its inclined face 33 engages the table and so that the rib 36 occupies a groove 39 formed in the table for its reception in alinement with the axis of the cutter 37. The heel-part is also laid so that the sole lies nearest the cutter. The heel-part is then advanced to the cutter which has an enlarged head and a reduced shank, each formed with cutting edges. The shank of the cutter is the same width as the rib 36. The heel blank is not passed entirely over the cutter but is advanced only so far as to cause the cutter to cut a groove 40 part way through as indicated by dotted lines in Fig. 8. The heel blank is then retracted and the remaining portion of the rib 36 planed off. The heel-part is now in condition to receive the tongue formed on the forepart, but prior to assembling the two parts 30 and 31, the upper end of the tongue 34 35 is severed flush with the face 32 so as to compensate for the abridgment of the groove 40 in the heel-part. The tongue is therefore severed at line $x$—$x$ of Fig. 7, after which the upper end of the tongue may be inserted in the lower end of the groove 40 and the two parts 30 and 31 moved into the relation shown by Fig. 10. It will be observed now that the inclined faces 32 and 33 which were formerly separated now abut against each other and are held in that relation by the interlocking function of the tongue and groove.

The next operation is to lock the forepart and heel-part against possibility of sliding with relation to each other, so that they may be held rigidly in a turning lathe for the purpose of turning the exterior of the blank. Inasmuch as the last is to be ultimately provided with locking means whereby the two parts may be prevented from becoming separated, I take this means of locking the two parts together for the turning operation. An appropriate locking device is illustrated in Fig. 12. For its reception a hole is bored perpendicularly to the plane dividing the forepart and heel-part and is begun at the top of the heel-part and continued to and part way through the forepart as shown by Fig. 10. By so boring the parts, the heel-part is provided with an aperture 41 and the forepart is provided with a chamber 42 in alinement therewith. The locking device here shown comprises a tubular holder 43 of which one end is open and the other end partly closed by an end wall. The closed end of the holder is inserted in the chamber 42 so that the open end lies flush with the face of the tongue member and it contains a spring plunger 44 having a reduced stem 45 extending through the partially closed inner end thereof. A helical spring 46 is coiled about the stem and compressed between the end wall of the holder and the larger portion of the plunger and exerts its tension so as to force the plunger toward the heel-part. A head 47 is provided on the inner end of the stem 45 for the purpose of limiting the outward movement of the plunger and preventing its removal from the holder. The outer end of the plunger is adapted to enter into the aperture 41 of the heel-part and the said aperture may be provided with a metal bushing 48 for its reception. Prior to assembling the forepart and heel-part, the latter may, if desired, be provided with an indentation presenting an abrupt face 49 and an inclined face 50 as shown by Fig. 12 for a purpose hereinafter explained. The plunger 44 normally assumes locking relation and in this relation the unfinished forepart and heel-part are mounted in a suitable support in a turning lathe for the purpose of shaping the exterior of the last. The operation of so shaping the last is well known and needs no explanation other than a statement that it is positioned in the lathe according to the indentations made by the center screws 128. After the completion of the turning operation, the usual unturned center portions of the heel and toe may be trimmed in the usual way and the last finally secured and polished. After these final operations, the last is in a completed state and the heel-part may be unlocked so that it may slide relatively to the forepart by inserting a straight tool in the open end of the chamber 41 and forcing back the plunger 44. When the heel-part is moved along the tongue portion of the forepart, the plunger 44 engages the inclined face 50 which enables it to enter the indentation formed in the heel-part so that it may abut against the face 49 and in that way act as a stop for preventing undue movement of the heel-part and separation from the forepart. When it is desired to move the heel-part back to closed position, a slight downward pressure on the heel part is sufficient to cause the inclined face 50 to force the plunger back into the forepart until the aperture 41 is moved into alinement with the plunger whereupon the latter is automatically projected again into locking position in the chamber.

Having thus explained the nature of my said invention and described a way of constructing the same, although without attempting to set forth all of the forms in which it may be made, I declare that what I claim is:

1. The herein described process of forming a two part last and consisting in severing a blank into a heel-part and forepart and forming an undercut tongue on one part during the severing operation, forming an undercut groove in the other part for said tongue, assembling the two parts with the tongue occupying said groove, and finally turning the blank while so assembled.

2. The herein described process of forming a two part last and consisting in severing a blank into a heel-part and forepart and, while severing, in forming a rib on one part and an undercut tongue on the other, forming an undercut groove in the ribbed part, using the rib as means for guiding said part to the grooving tool, assembling the forepart and heel-part with the tongue in the groove, and turning the blank while so assembled.

3. The herein described process of forming a two part last and consisting in severing a blank into a heel-part and forepart, forming one part with an undercut tongue extending from the sole part way toward the top, forming the other part with a complemental undercut groove extending from the sole part way toward the top to receive said tongue, assembling the two parts, and finally shaping the exterior of the blank while so assembled.

4. The herein described process of forming a two part last and consisting in severing a blank into a heel-part and forepart, forming one part with an undercut tongue and the other with an undercut groove to receive the tongue, assembling the two parts, boring through one part and into the other on a line substantially perpendicular to the plane of division, arranging a locking device in the bored chamber, and finally shaping the exterior of the blank while so assembled and locked.

5. The herein described process of forming a two part last and consisting in mounting a blank between end indenting tools, severing the blank, while held between said tools, into a forepart and heel-part, forming the two parts with an interlocking tongue and groove, assembling the forepart and heel-part and locking them together, and mounting the assembled parts in a last-turning lathe with the end indentations formed by said tools upon the coöperative work centers of the lathe.

6. The herein described process of forming a two part last and consisting in mounting the ends of a blank upon indenting center points, severing the blank into a forepart and heel-part by severing cutters bearing a definite constant angular relation to the center points, forming the two parts with an interlocking tongue and groove, assembling said parts and locking them in interlocked relation, and arranging the assembled parts in a last-turning lathe with the end indentations upon the coöperative work centers thereof.

In testimony whereof I have affixed my signature, in presence of two witnesses.

HARRIE A. BALLARD.

Witnesses:
  GEO. T. ARMSTRONG,
  M. E. COPEN.